(12) United States Patent
Li et al.

(10) Patent No.: US 9,430,640 B2
(45) Date of Patent: Aug. 30, 2016

(54) CLOUD-ASSISTED METHOD AND SERVICE FOR APPLICATION SECURITY VERIFICATION

(71) Applicant: Intel Corporation, Santa Clara, CA (US)

(72) Inventors: Hong Li, El Dorado Hills, CA (US); James R. Blakley, Portland, OR (US); Rita H. Wouhaybi, Portland, OR (US); John B. Vicente, Roseville, CA (US); Mark D. Yarvis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 13/631,283

(22) Filed: Sep. 28, 2012

(65) Prior Publication Data

US 2014/0096241 A1    Apr. 3, 2014

(51) Int. Cl.
  *G06F 17/30* (2006.01)
  *G06F 21/51* (2013.01)
  *H04L 29/06* (2006.01)

(52) U.S. Cl.
  CPC ............. *G06F 21/51* (2013.01); *H04L 63/12* (2013.01); *H04L 63/168* (2013.01); *G06F 2221/033* (2013.01); *G06F 2221/2119* (2013.01)

(58) Field of Classification Search
  CPC ........ G06F 21/56; G06F 21/00; G06F 21/51; G06F 21/55; G06F 2221/2141; H04L 63/0227; H04L 63/1441; H04L 63/1425; H04L 63/14; H04L 63/1416; H04L 63/1475
  See application file for complete search history.

(56) References Cited

U.S. PATENT DOCUMENTS

| 8,230,088 B2 | 7/2012 | Herman et al. |
| 8,392,973 B2 | 3/2013 | Bank et al. |

(Continued)

FOREIGN PATENT DOCUMENTS

| JP | 2010157211 A | 7/2010 |
| WO | 2012/065551 A1 | 5/2012 |

(Continued)

OTHER PUBLICATIONS

International Search Report and Written Opinion for PCT Application No. PCT/US2013/062407, mailed on Jan. 28, 2014, 24 pages.

(Continued)

*Primary Examiner* — Nirav B Patel
*Assistant Examiner* — Mohammed Waliullah
(74) *Attorney, Agent, or Firm* — Barnes & Thornburg LLP

(57) ABSTRACT

A method, device, and system for browser-based application security verification is disclosed. A client device requests a browser-based application from a web server. An application security module of the client device intervenes and transmits an application verification request to a cloud service system. The cloud service system retrieves data regarding the security of the application and source from cloud resources and a local database of the cloud server. The cloud service system then uses the data to authenticate the source and verify the security of the browser-based application. The cloud service system provides the client device with a recommendation regarding the security of the browser-based application and updates its local database. The client device may then consider the recommendation in determining whether to download or execute the browser-based application and provide feedback to the cloud service system. The client device may also perform a local security analysis after receiving the cloud service system's recommendation.

22 Claims, 5 Drawing Sheets

(56) References Cited

U.S. PATENT DOCUMENTS

| | | |
|---|---|---|
| 8,566,901 B2 | 10/2013 | Kay et al. |
| 2003/0177248 A1 | 9/2003 | Brown et al. |
| 2008/0010683 A1 | 1/2008 | Baddour et al. |
| 2008/0104699 A1 | 5/2008 | Gounares et al. |
| 2008/0222238 A1* | 9/2008 | Ivanov et al. ............... 709/202 |
| 2009/0070873 A1 | 3/2009 | McAfee et al. |
| 2009/0249489 A1 | 10/2009 | Livshits et al. |
| 2010/0169974 A1 | 7/2010 | Calendino et al. |
| 2010/0235885 A1 | 9/2010 | Persson et al. |
| 2010/0332837 A1 | 12/2010 | Osterwalder |
| 2011/0145926 A1 | 6/2011 | Dalcher et al. |
| 2011/0167474 A1* | 7/2011 | Sinha et al. ................... 726/1 |
| 2011/0317211 A1* | 12/2011 | Yamada et al. ............ 358/1.15 |
| 2012/0110174 A1* | 5/2012 | Wootton et al. ............ 709/224 |
| 2012/0117650 A1 | 5/2012 | Nachenberg |
| 2012/0192280 A1 | 7/2012 | Venkatakrishnan et al. |
| 2012/0210431 A1 | 8/2012 | Stahlberg et al. |
| 2012/0216133 A1 | 8/2012 | Barker et al. |
| 2013/0055387 A1* | 2/2013 | Kim et al. ...................... 726/22 |
| 2014/0006711 A1 | 1/2014 | Xing |
| 2014/0090008 A1 | 3/2014 | Li et al. |
| 2014/0090009 A1 | 3/2014 | Li et al. |
| 2014/0090066 A1 | 3/2014 | Li et al. |
| 2014/0130187 A1 | 5/2014 | Prashant et al. |
| 2014/0181888 A1 | 6/2014 | Li et al. |
| 2014/0189778 A1 | 7/2014 | Li et al. |

FOREIGN PATENT DOCUMENTS

| | | |
|---|---|---|
| WO | 2014052892 A1 | 4/2014 |
| WO | 2014105856 A1 | 7/2014 |

OTHER PUBLICATIONS

Web container, Wikipedia, The Free Encyclopedia, retrieved from: <http://en.wikipedia.org/w/index.php?title=Web_container&oldid=484851882>, edited Mar. 31, 2012, 2 pages.
Code signing, Wikipedia, The Free Encyclopedia, retrieved from: <http://en.wikipedia.org/w/index.php?title=Code_signing&oldid=483061773>, edited Mar. 21, 2012, 3 pages.
U.S. Appl. No. 13/628,219, filed Sep. 27, 2012, 23 pages.
U.S. Appl. No. 13/628,221, filed Sep. 27, 2012, 27 pages.
U.S. Appl. No. 13/628,502, filed Sep. 27, 2012, 22 pages.
U.S. Appl. No. 13/729,605, filed Dec. 28, 2012, 29 pages.
U.S. Appl. No. 13/671,690, filed Nov. 8, 2012, 13 pages.
U.S. Appl. No. 13/721,912, filed Dec. 20, 2012, 31 pages.
European Search Report for Application No. 13840323.3-1853/2901615, dated May 25, 2016, 8 pages.

* cited by examiner

CLOUD-ASSISTED METHOD AND SERVICE FOR APPLICATION SECURITY VERIFICATION

BACKGROUND

The arrival of the HTML5 programming platform to the web community has enabled a fast-paced and dynamic experience for the interacting user. The programming platform combines application programming interfaces (API's) with dynamic content generation and presentation, thus enabling developers to incorporate increased features and capabilities into browser-based applications. For example, HTML5 allows developers to integrate active code into a webpage that is able to execute inside the browser of the client device.

Unfortunately, the dynamic nature of HTML5 has also introduced a number of security risks to the user. Because the programming platform allows developers to incorporate active code into a webpage, oftentimes the code may execute without the user's knowledge about the code. Some existing solutions allow the client device to validate the authenticity of the application. For example, some developers may use digital signatures to sign their developed software to allow the client device may validate the code upon downloading it. However, those solutions only provide authenticity verification of software delivered by particular developers or publishers, in a single-source and one-time fashion. Furthermore, such solutions do not provide dynamic verification of web service applications (e.g., HTML 5-based dynamic content creation and browser plug-ins) that are independent of the specific software vendor or service provider. As such, there are limited options available to users to ensure that a browser-based application is secure prior to downloading or executing the application.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
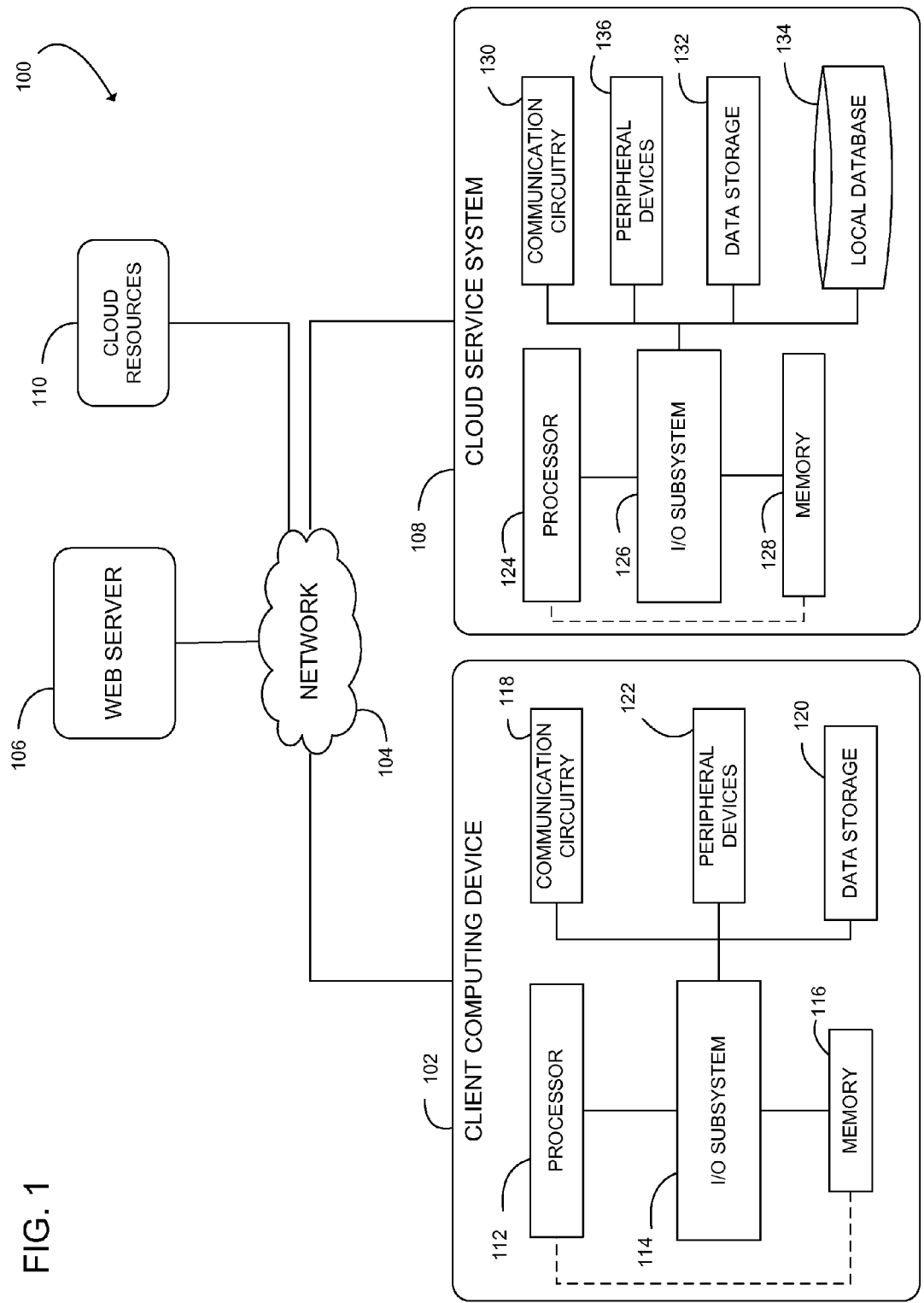
FIG. 1 is a simplified block diagram of at least one embodiment of a system for browser-based application security verification.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for cloud-assisted browser-based application security verification includes a client computing device 102, network 104, a web server 106, a cloud service system 108, and cloud resources 110, which may be internal or external to the cloud service system 108. In use, as discussed in more detail below, the client computing device 102 may securely launch a browser-based application 304 (see FIG. 3) requested from the web server 106 in response to a positive recommendation of the cloud service system 108 regarding the security of the browser-based application 304. Although only one client computing device 102, one network 104, one web server 106, one cloud service system 108, and one cloud resources 110 are illustratively shown in FIG. 1, the system 100 may include any number of client computing devices 102, networks 104, web servers 106, cloud service systems 108, and cloud resources 110 in other embodiments. For example, in some embodiments, one cloud service system 108 may communicate with several client computing devices 102 over several networks 104 to verify the security of multiple browser-based applications 304 requested from multiple web servers 106.

The client computing device 102 may be embodied as any type of computing device capable of performing the functions described herein. For example, the client computing device 102 may be embodied as an enterprise-level server, a desktop computer, a laptop computer, a mobile internet device, a handheld computer, a smart phone, a personal digital assistant, a telephony device, or other computing device. In the illustrative embodiment of FIG. 1, the client computing device 102 includes a processor 112, an I/O subsystem 114, a memory 116, communication circuitry 118, a data storage device 120, and one or more peripheral devices 122. In some embodiments, several of the foregoing components may be incorporated on a motherboard of the client computing device 102, while other components may be communicatively coupled to the motherboard via, for example, a peripheral port. Furthermore, it should be appreciated that the client computing device 102 may include other components, sub-components, and devices commonly found in a computer and/or computing device, which are not illustrated in FIG. 1 for clarity of the description.

The processor 112 of the client computing device 102 may be embodied as any type of processor capable of executing software/firmware, such as a microprocessor, digital signal processor, microcontroller, or the like. In some embodiments, the processor 112 may be a single core processor having a processor core. However, in other embodiments, the processor 112 may be embodied as a multi-core processor having multiple processor cores. Additionally, the client computing device 102 may include additional processors 112 having one or more processor cores.

The I/O subsystem 114 of the client computing device 102 may be embodied as circuitry and/or components to facilitate input/output operations with the processor 112 and/or other components of the client computing device 102. In some embodiments, the I/O subsystem 114 may be embodied as a memory controller hub (MCH or "northbridge"), an input/output controller hub (ICH or "southbridge"), and a firmware device. In such embodiments, the firmware device of the I/O subsystem 114 may be embodied as a memory device for storing Basic Input/Output System (BIOS) data and/or instructions and/or other information (e.g., a BIOS driver used during booting of the client computing device 102). However, in other embodiments, I/O subsystems having other configurations may be used. For example, in some embodiments, the I/O subsystem 114 may be embodied as a platform controller hub (PCH). In such embodiments, the memory controller hub (MCH) may be incorporated in or otherwise associated with the processor 112, and the processor 112 may communicate directly with the memory 116 (as shown by the hashed line in FIG. 1). Additionally, in other embodiments, the I/O subsystem 114 may form a portion of a system-on-a-chip (SoC) and be incorporated, along with the processor 112 and other components of client computing device 102, on a single integrated circuit chip.

The processor 112 is communicatively coupled to the I/O subsystem 110 via a number of signal paths. These signal paths (and other signal paths illustrated in FIG. 1) may be embodied as any type of signal paths capable of facilitating communication between the components of the client computing device 102. For example, the signal paths may be embodied as any number of wires, cables, light guides, printed circuit board traces, via, bus, intervening devices, and/or the like.

The memory 116 of the client computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 116 is communicatively coupled to the I/O subsystem 114 via a number of signal paths. Although only a single memory device 116 is illustrated in FIG. 1, the client computing device 102 may include additional memory devices in other embodiments. Various data and software may be stored in the memory device 116. For example, one or more operating systems, applications, programs, libraries, and drivers that make up the software stack executed by the processor 112 may reside in memory 116 during execution. Furthermore, software and data stored in memory 116 may be swapped between the memory 116 and the data storage 120 as part of memory management operations.

The communication circuitry 118 of the client computing device 102 may be embodied as any number of devices and circuitry for enabling communications between the client computing device 102 and remote computing devices (e.g., the web server 106 and the cloud service system 108) over the network 104. The network 104 may be embodied as any number of various wired and/or wireless communication networks. For example, the network 104 may be embodied as or otherwise include a local area network (LAN), a wide area network (WAN), or a publicly-accessible, global network such as the Internet. Additionally, the network 104 may include any number of additional devices to facilitate communication between the client computing device 102, the web server 106, and the cloud service system 108. The client computing device 102, the web server 106, and the cloud service system 108 may use any suitable communication protocol to communicate with one another over the network(s) 104 depending on, for example, the particular type of network(s) 104. In the illustrative embodiment of FIG. 1, the cloud service system 108 may also communicate with the cloud resources 110 over the network(s) 104. In some embodiments, the cloud resources 110 are accessible by the cloud service system 108 but are inaccessible by the client computing device 102 and/or the web server 106.

The data storage device(s) 120 may be embodied as any type of device or devices configured for the short-term or long-term storage of data such as, for example, memory devices and circuits, memory cards, hard disk drives, solid-state drives, or other data storage devices. For example, as discussed in more detail below, a portion of the browser-based application 304 (i.e., executable code) may be stored in a secure location of the data storage device(s) 120, in some embodiments, to be accessed by a local code analysis module 308 (see FIG. 3).

The peripheral devices 122 of the client computing device 102 may include any number of peripheral or interface devices. For example, the peripheral devices 122 may include a display, a keyboard, a mouse, external speakers, and/or other peripheral devices. The particular devices included in the peripheral devices 122 may depend upon, for example, the intended use of the client computing device 102. The peripheral devices 122 are communicatively coupled to the I/O subsystem 114 via a number of signal paths thereby allowing the I/O subsystem 114 and/or processor 112 to receive inputs from and send outputs to the peripheral devices 122.

The web server 106 may be embodied as any type of data server(s) or other computing device(s) capable of performing the functions described herein. For example, the web server 106 in the illustrative embodiment of FIG. 1 is capable of generating and transmitting the browser-based application 304 to the client computing device 102 over the network 104. In some embodiments, the web server 106 may include components similar to the components of the client computing device 102 as discussed above. It should be appreciated that the web server 106 may include other components, sub-components, and devices commonly found in a server and/or computing device, which are not illustrated in FIG. 1 for clarity of the description. Additionally, although the web server 106 is illustrated in FIG. 1 as a single, individual web server, the web server 106 may be embodied as a collection of web servers and/or similar devices capable of generating and transmitting the browser-based application 304 as discussed above.

In the illustrative embodiment of FIG. 1, the cloud service system 108 is embodied as a cloud service server including a processor 124, an I/O subsystem 126, a memory 128, a communication circuitry 130, a data storage device 132, a local database 134, and one or more peripheral devices 136. In some embodiments, several of the foregoing components may be incorporated on a motherboard of the cloud service system 108, while other components may be communicatively coupled to the motherboard via, for example, a peripheral port. Furthermore, it should be appreciated that the cloud service system 108 may include other components, sub-components, and devices commonly found in a server and/or computing device, which are not illustrated in FIG. 1 for clarity of the description. Additionally, although the cloud service system 108 is illustrated in FIG. 1 and discussed below as a single, individual cloud service server, the cloud service system 108 may be embodied as a collection of cloud servers and/or similar devices that cooperate to provide one or more cloud services as discussed below.

The processor 124, the I/O subsystem 126, the memory 128, the communication circuitry 130, the data storage device 132, and the one or more peripheral devices 136 of the cloud service system 108 may be similar to the corresponding components of the client computing device 102 as described above. As such, the description of such similar components of the client computing device 102 is equally applicable to the similar components of the cloud service system 108 and are not repeated herein for clarity of the description. Additionally, the local database 134 of the cloud service system 108 may be embodied as any electronic arrangement or structure suitable for storing data directed to the security of the browser-based application(s) 304 and sources of the browser-based application(s) 304.

In the illustrative embodiment of FIG. 1, the cloud resources 110 include data and other electronic resources that may be used by the cloud service system 108 to authenticate the source of the browser-based application 304 and/or verify the integrity of the browser-based application 304. In some embodiments, the cloud resources 110 may include other servers and/or computing devices belonging to the same cloud computing environment as the cloud service system 108. In other embodiments, the cloud resources 110 may include one or more databases or other data structures for storing browser-based application verification data and/or source authentication data.

Figure 2:
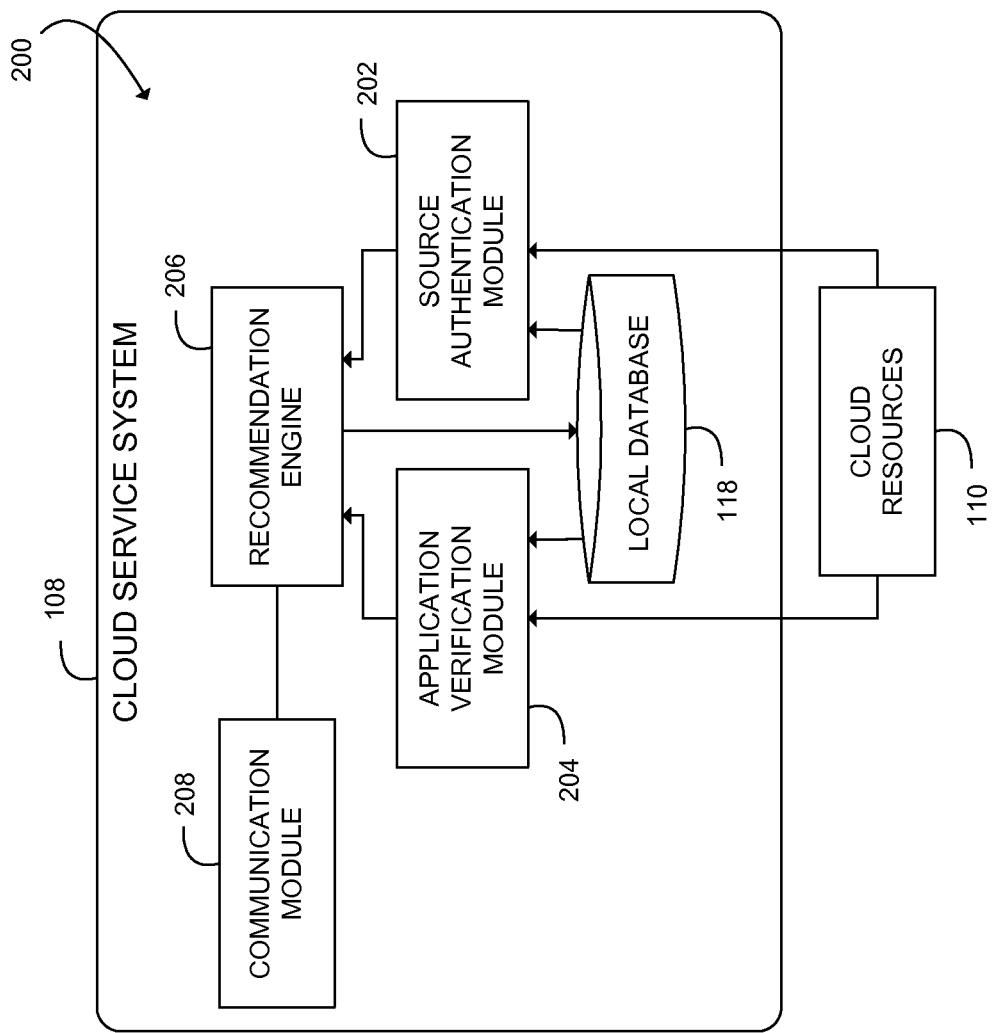
FIG. 2 is a simplified block diagram of at least one embodiment of an environment of a cloud service server of the system of FIG. 1.

In use, as shown in FIG. 2, the cloud service system 108 may establish an environment 200 for generating a security recommendation for the browser-based application 304 on the cloud service system 108. In the illustrative embodiment, the environment 200 includes a source authentication module 202, an application verification module 204, a recommendation engine 206, and a communication module 208, each of which may be embodied as software, firmware, hardware, or a combination thereof.

The source authentication module 202 is configured to authenticate the source of the browser-based application 304 (e.g., the website from which the browser-based application 304 was downloaded). To do so, the source authentication module 202 may retrieve source authentication data from the local database 118 of the cloud service system 108 and/or the cloud resources 110. The source authentication data may be embodied as any type of data usable by the source authentication module 202 to determine a trustworthiness of the source of the browser-based application 304. For example, the source authentication data may be embodied as, or otherwise include, information identifying known trusted and/or malicious browser-based application 304 distributors or hosts (e.g., websites).

The source authentication module 202 may also receive application source data, which identifies the particular source of the browser-based application 304, from the client computing device 102 or the web server 106. In such embodiments, the source authentication module 202 may authenticate the source of the browser-based application 304 by comparing the application source data to the source authentication data to determine whether the identified source of the browser-based application 304 is a secure and trusted host or entity.

The application verification module 204 is configured to verify the security of the browser-based application 304 itself. To do so, in some embodiments, the application verification module 204 may retrieve application validation data from the local database 118 of the cloud service system 108 and/or retrieve the application validation data from the cloud resources 110. The application validation data may be embodied as trusted source code that the application verification module 204 may compare with the browser-based application 304 code. In such embodiments, the application verification module 204 may compare the trusted source code to the code of the browser-based application to verify the security of the browser-based application 304. Additionally or alternatively, the application validation data may include known virus signatures or patterns usable by the application verification module 204 to analyze the code of the browser-based application 304. That is, the application verification module 204 may perform a code analysis of the browser-based application 304 to determine whether the browser-based application 304 contains malicious code or is otherwise fraudulent. Additionally, in some embodiments, the application verification module 204 may determine the identity of the developer/publisher of the browser-based application 304. For example, similar to the source authentication data, the application validation data may include information regarding known trusted and malicious browser-based application 304 developers and publishers that may be used by the application verification module 204 in verifying the security of the browser-based application 304.

The recommendation engine 206 is configured to provide a recommendation to the client computing device 102 regarding the security of the browser-based application 304 based on the analysis performed by the source authentication module 202 and/or the application verification module 204. As discussed above, the source authentication module 202 analyzes the source of the browser-based application 304, and the application verification module 204 analyzes the browser-based application 304 itself. In some embodiments, the recommendation engine 206 may correlate the analyses of the source authentication module 202 and the application verification module 204 to determine whether the browser-based application 304 is secure and make a recommendation to the client computing device 102. The security recommendation of the recommendation engine 206 may be of many different forms. For example, in some embodiments, the recommendation engine 206 may recommend that the client computing device 102 execute the browser-based application 304 only if the source authentication module 202 determined that the source of the browser-based application 304 is a trusted source and/or the application verification module 204 determined that the browser-based application 304 was developed or published by a trusted party. In other embodiments, the recommendation engine 206 may provide the client computing device 102 with a percent likelihood that the browser-based application 304 is secure or otherwise based the recommendation on some threshold. Of course, other forms of recommendations may be used in other embodiments. The recommendation engine 206 may transmit the recommendation to the client using the communication module 208, which handles communication between the cloud service system 108 and other devices of the system 100.

Figure 3:
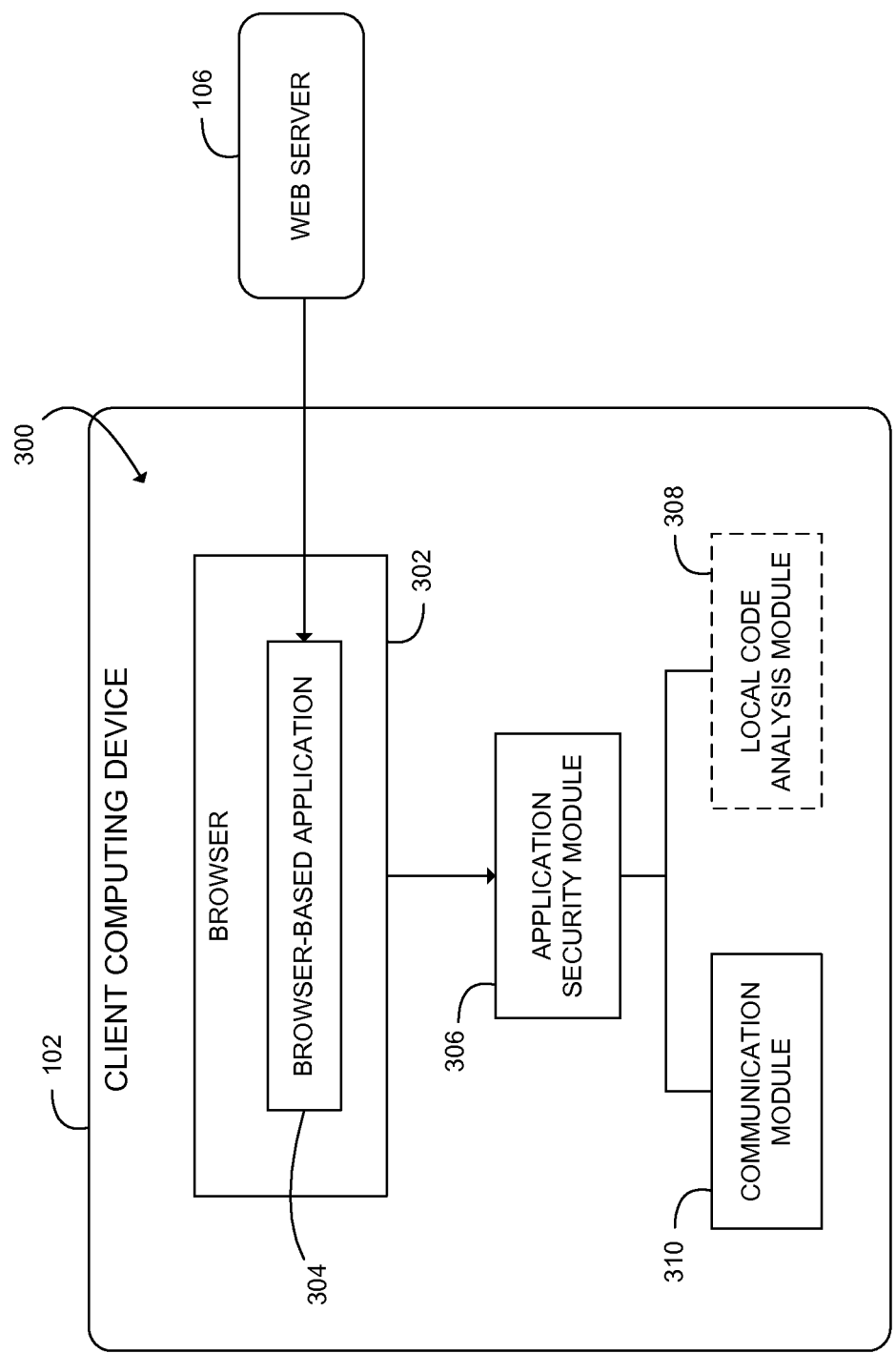
FIG. 3 is a simplified block diagram of at least one embodiment of an environment of a client computing device of the system of FIG. 1.

Referring now to FIG. 3, in use, the client computing device 102 may establish an environment 300 for verifying the security of the browser-based application 304 requested by the client computing device 102. The environment 300 in the illustrative embodiment includes a browser 302, the browser-based application 304, an application security module 306, a local code analysis module 308, and a communication module 310, each of which may be embodied as software, hardware, firmware, and/or a combination thereof.

The browser 302 of the client computing device 102 may be used to request and interpret the browser-based application 304 from the web server 106. In some embodiments, the browser-based application 304 may be embodied as a Hypertext Markup Language 5 (HTML5) application. In other embodiments, the browser-based application 304 may be embodied as any software application capable of being executed and/or interpreted by the browser 302 of the client computing device 102.

The application security module 306 is configured to perform the security verification of the browser-based application 304 on the client computing device 102. The application security module 306 may be embodied as an independent module or, in some embodiments, may be embodied as a browser plug-in. As discussed below, if the browser 302 has requested the browser-based application 304, the application security module 306 may request the cloud service system 108 to verify the security of the requested browser-based application 304 using the communication module 310, which receives the results of the verification from the could service system 108. In some embodiments, the application security module 306 may forward the request to the cloud service system 108 for analysis before permitting the browser 302 to execute the browser-based application 304 or download any portion of the browser-based application 304. Additionally, in some embodiments, the results of the verification by the could service system 108 may include instructions or directions to be performed by the client computing device 102. In such embodiments, the application security module 306 is configured to perform such additional instructions or actions, which may include any type of security action such as, for example, to delete or quarantine the browser-based application 304.

In some embodiments, the client computing device 102 may also include the local code analysis module 308. In such embodiments, the local code analysis module 308 may be configured to determine whether the browser-based application 304 contains malicious code or is otherwise fraudulent, similar to the application verification module 204 of the cloud service system 108. For example, in some embodiments, the local code analysis module 308 may further analyze the browser-based application 304 after receiving a recommendation from the cloud service system 108 and/or perform additional security measures with regard to the browser-based application 304.

Figure 4:
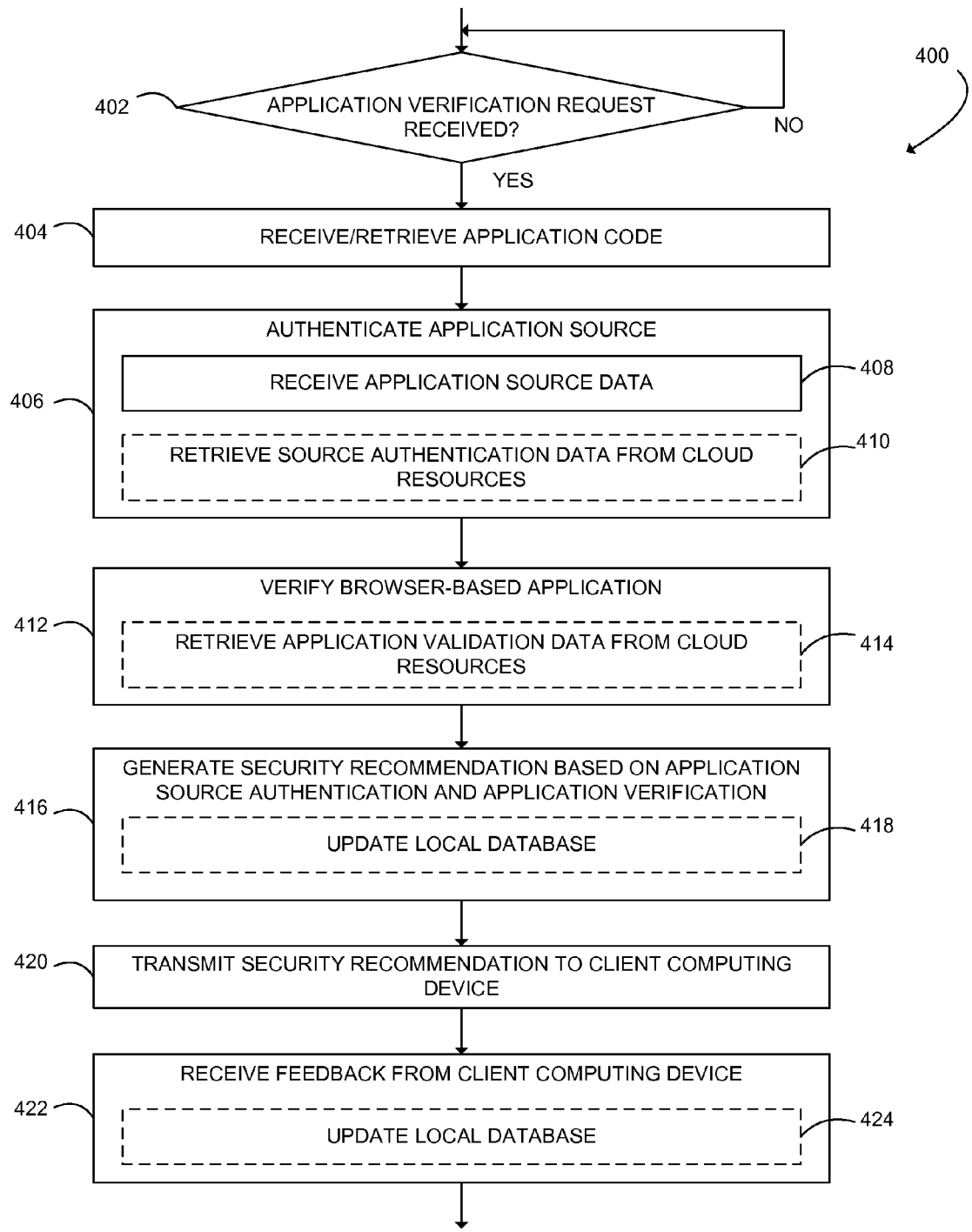
FIG. 4 is a simplified flow diagram of at least one embodiment of a method for generating a security recommendation for a browser-based application using the cloud service server of FIG. 1.

Referring now to FIG. 4, an illustrative embodiment of a method 400 for generating a security recommendation regarding the browser-based application 304, which may be performed by the cloud service system 108, begins with block 402. In block 402, the cloud service system 108 determines whether an application verification request to verify the security of the browser-based application 304 has been received from the client computing device 102. If so, the cloud service system 108 receives the browser-based application 304 or a portion, of the code of the browser-based application 304, in block 404. In some embodiments, the cloud service system 108 may receive, in block 404, metadata from the client computing device 102 indicating the location of the browser-based application 304 and download the browser-based application 304 from the web server 106 at the specified location. For example, the client computing device 102 may provide the cloud service system 108 with the uniform resource locator (URL) of the browser-based application 304. The cloud service system 108 may use the location information provided by the client computing device 102 to retrieve the browser-based application 304 for analysis.

In block 406, the cloud service system 108 authenticates the source of the browser-based application 304. To do so, the cloud service system 108 may additionally receive application source data from the client computing device 102 in block 408. As discussed above, the application source data may be embodied as any type of data that identifies the source of the browser-based application 304. For example, the application source data may identify the top-level domain, sub-domain, or internet protocol (IP) address associated with the browser-based application 304. Alternatively, in embodiments in which the application source data is not specifically identified, the cloud service system 108 may use the location data provided by the client computing device 102 in block 404 to determine the source of the browser-based application 304. In some embodiments, the cloud service system 108 may download the browser-based application 304 and/or the application source data from a remote server other than the client computing device 102 or web server 106.

In some embodiments, the source authentication module 202 of the cloud service system 108 may also retrieve source authentication data from the local database 118 of the cloud service system 108 and/or from the cloud resources 110 in block 410. As discussed above, the source authentication data may be embodied as, or otherwise include, any type of data usable by the cloud service system 108 to determine the trustworthiness of the source of the browser-based application 304. For example, the source authentication data may include data that identifies known hosts of malicious browser-based applications 304. In other embodiments, the source authentication data may include data that identifies trusted hosts of browser-based applications 304. In still other embodiments, the source authentication data may include a combination of the previously-described information and/or other information directed to the trustworthiness of the source of the browser-based application 304. As such, in some embodiments, the cloud service system 108 may authentication the source of the browser-based application in block 406 by comparing the identified application source data to the retrieved source authentication module to determine the trustworthiness (or lack thereof) of the identified source.

In block 412, the cloud service system 108 verifies the security of the browser-based application 304 itself. To do so, the cloud service system 108 may retrieve application validation data in block 412. Similar to the source authentication data retrieved in block 410, the cloud service system 108 may retrieve the application validation data from the local database 118 of the cloud service system 108 and/or from the cloud resources 110 in block 414. The application validation data may be embodied as any type of data usable by the cloud service system 108 to verify the security (e.g., trustworthiness, maliciousness, etc.) of the browser-based application 304. For example, as discussed above, the application validation data may be embodied as known, trusted source code. Additionally or alternatively, the application validation data may be embodied as, or otherwise include, signatures and patterns of known viruses and other malware. Further, the application validation data may include information regarding the trustworthiness of known browser-based application 304 developer and publishers.

The cloud service system 108 may verify the security and integrity of the browser-based application 304 in block 412 by comparing the browser-based application 304 retrieved in block 404 to the application validation data retrieved in block 414. For example, the cloud service system 108 may perform a code analysis of the browser-based application 304 and compare the browser-based application 304 to malware signatures to determine whether the browser-based application 304 contains malicious code or is otherwise fraudulent. Additionally or alternatively, the cloud service system 108 may analyze the code of the browser-based application 304 to verify that the code is stable and safely operable on the client computing device 102. In such embodiments, the recommendation engine 206 may notify the client computing device 102 of a location of the most stable current release of the browser-based application 304.

It should be appreciated that blocks 406 and 412 of the method 400 may occur in any order or may occur concurrently. Furthermore, in some embodiments, if either of the blocks 406 and 412 provides an indication that the browser-based application 304, or its source, is unsecure, the cloud service system 108 may or may not execute the other block. Rather, the cloud service system 108 may simply recommend that the client computing device 102 refrain from downloading or executing the browser-based application 304 as discussed below.

In block 416, the cloud service system 108 may generate a security recommendation for the client computing device 102 as a function of the source authentication of block 406 and the browser-based application verification of block 412. As discussed above, the security recommendation provides some indication to the client computing device 102 regarding whether the browser-based application 304 is secure. For example, the cloud service system 108 may recommend that the client computing device 102 execute the browser-based application 304 if both the source and the browser-based application 304 have been determined to be secure. Otherwise, the cloud service system 108 may recommend that the client computing device 102 refrain from downloading or executing the browser-based application 304 and delete any downloaded portions of the browser-based application code. In other embodiments, the cloud service system 108 may generate a likelihood (e.g., expressed as a percentage or other numerical representation) that the browser-based application 304 is secure, and the client computing device 102 may utilize such likelihood to determine whether to execute the browser-based application 304. That is, the cloud service system 108 may identify a level of trust of the browser-based application 304. For example, the browser-based application 304 may be identified as secure if both the browser-based application 304 and its source have been determined to be secure, as possibly unsecure if only one of the browser-based application and its source have been determined to be secure, and as unsecure if neither the browser-based application nor its source have been determined to be secure. In block 418, the cloud service system 108 may update the local database 118 with its recommendation and/or security information received from the cloud resources 110.

In block 420, the cloud service system 108 may transmit the security recommendation generated in block 416 to the client computing device 102. Thereafter, the cloud service system 108 may receive feedback from the client computing device 102 in block 422. In some embodiments, the feedback may include the security action taken by the client computing device 102 in response to the security recommendation. For example, the feedback may indicate whether the client computing device 102 executed the browser-based application 304. Additionally, the feedback may indicate that the client computing device 102, for example, notified the user of the security recommendation, deleted or refrained from downloading the browser-based application, or quarantined the browser-based application 304. In embodiments in which the client computing device 102 performs a local security analysis of the browser-based application 304 (see block 512 of FIG. 5), the feedback may also include the results of the local security analysis. In block 424, the cloud service system 108 may update the local database 118 with the feedback from the client computing device 102.

Figure 5:
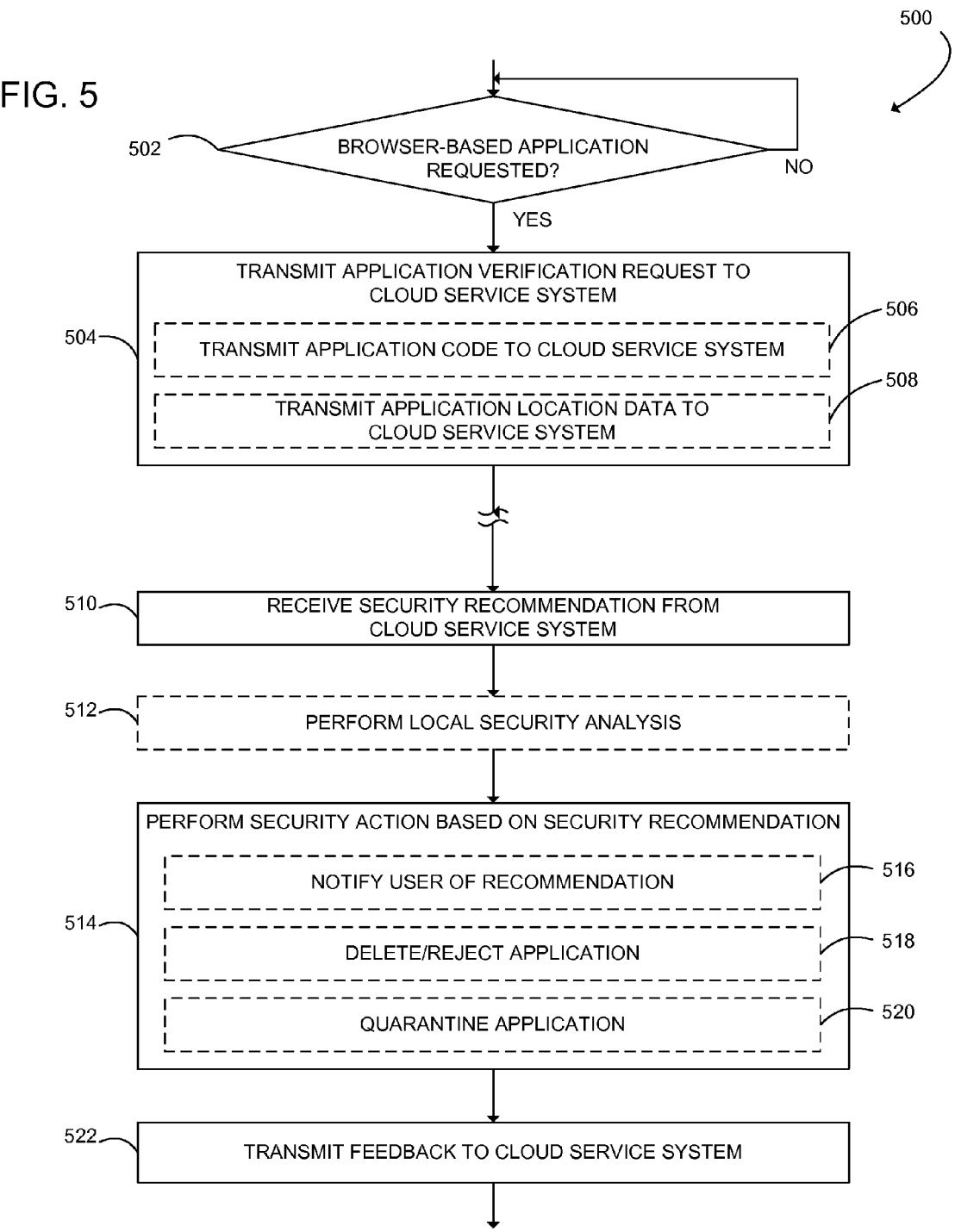
FIG. 5 is a simplified flow diagram of at least one embodiment of a method for verifying the security of a browser-based application accessed by the client computing device of FIG. 1.

Referring now to FIG. 5, an illustrative embodiment of a method 500 for verifying the security of the browser-based application 304, which may be executed by the client computing device 102, begins with block 502. In block 502, the client computing device 102 determines whether the browser-based application 304 has been requested. For example, in some embodiments, the security module 306 of the client computing device 102 may monitor the browser 302 to determine when a user of the client computing device 102 executes a hyperlink directed to the browser-based application 304. If the client computing device 102 determines that the browser-based application 304 has been requested, the client computing device 102 transmits a request to the cloud service system 108 to verify the security of the browser-based application 304 in block 504. As discussed above, in doing so, the client computing device 102 may transmit the browser-based application 304, or any downloaded portions of the browser-based application 304 or its source code, to the cloud service system 108 in block 506. Alternatively, the client computing device 102 may transmit data identifying the location at which the browser-based application 304 is available to the cloud service system 108 in block 508. For example, the client computing device 102 may transmit the URL of the browser-based application 304 to the cloud service system 108. In the illustrative embodiment of FIG. 5, the client computing device 102 does not execute the browser-based application 304 until the cloud service system 108 verifies the security of the browser-based application 304 (as indicated by the double-tilde symbol in FIG. 5).

In block 510, client computing device 102 receives the security recommendation from the cloud service system 108. As discussed above, the security recommendation may indicate, for example, whether the browser-based application 304 is secure and/or a level of security of the browser-based application 304. In some embodiments, similar to verifying the security of the browser-based application 304 on the cloud service system 108, in block 512, the client computing device 102 may download and perform a local security analysis of the browser-based application 304. The local code analysis module 308 of the client computing device 102 may compare the browser-based application 304 to virus or malware signatures and patterns to determine whether the browser-based application 304 contains malicious code. In other embodiments, the client computing device 102 may perform additional or alternative code analysis to locally verify the security of the browser-based application 304. Additionally, in some embodiments, the local security analysis performed in block 512 may be performed prior to the client computing device 102 transmitting the browser-based application 304 to the cloud service system 108. In such embodiments, if the client computing device 102 locally determines that the browser-based application 304 has security risks (e.g., includes malware), the client computing device 102 may simply discard the browser-based application 304 at that time without sending it on to the cloud service system 108. In other embodiments, the client computing device 102 may transmit the browser-based application 304 to the could service system 108 regardless of the outcome of the local security analysis.

In block 514, the client computing device 102 may perform a security action based on the security recommendation received from the cloud server in block 510. In some embodiments, the client computing device 102 may notify the user of the security recommendation (e.g., if the security recommendation is to not download/execute the browser-based application 304). For example, in block 516, the user of the client computing device 102 may be notified through the browser 302 or another graphical user interface. In other embodiments, the client computing device 102 may delete the source code of the browser-based application 304, or any portion downloaded thereof, from the memory 116 of the client computing device 102 in block 518. In embodiments in which the client computing device 102 has not downloaded any portion of the browser-based application 304, the client computing device 102 may prevent the user from downloading the browser-based application 304. In other embodiments, the client computing device 102 may quarantine the browser-based application 304, or any downloaded portions thereof, in a secure location of the memory 116 of the client computing device 102 in block 520. If the cloud service system 108 determined that the browser-based application 304 is secure, however, the client computing device 102 may download and execute the browser-based application 304. In embodiments in which the client computing device 102 performs the local security analysis in block 512, the client computing device 102 may additionally consider the local security analysis in addition to the cloud service system 108 security recommendation.

In block 522, the client computing device 102 may transmit feedback to the cloud service system 108. As discussed above, the feedback may include the security action taken by the client computing device 102 in response to the security recommendation. Additionally, the feedback may include the result of any local security analysis performed on the browser-based application 304 by the client computing device 102. The cloud service system 108 may use the feedback to update the local database 118 of the cloud service system 108 with relevant browser-based application security information.

EXAMPLES

Illustrative examples of the devices, systems, and methods disclosed herein are provided below. An embodiment of the devices, systems, and methods may include any one or more, and any combination of, the examples described below.

Example 1 includes a cloud service system for generating a security recommendation for a browser-based application. The cloud server includes a communication module to receive an application verification request from a client computing device; a source authentication module to (i) receive application source data that identifies a source of the browser-based application, (ii) retrieve source authentication data; and (iii) authenticate the source as a function of the application source data and the source authentication data; an application verification module to (i) retrieve application validation data and (ii) verify the browser-based application as a function of the application validation data; and a recommendation engine to generate a security recommendation in response to the authentication of the source authentication module and the verification of the application verification module; wherein the communication module further to transmit the security recommendation to the client computing device.

Example 2 includes the subject matter of Example 1, and wherein the source authentication module is to (i) receive location data identifying a location of the browser-based application and (ii) download the browser-based application from a web server located at the identified location.

Example 3 includes the subject matter of any of Examples 1 and 2, and wherein the location data includes a uniform resource locator of the browser-based application.

Example 4 includes the subject matter of any of Example 1-3, and wherein the source authentication module is to retrieve the application source data from a remote location other than the client computing device and the application verification module is to retrieve the browser-based application from the remote location.

Example 5 includes the subject matter of any of Examples 1-4, and wherein the security recommendation identifies a level of trust of the browser-based application.

Example 6 includes the subject matter of any of Examples 1-5, and wherein the recommendation engine is to receive feedback from the client computing device in response to the security recommendation.

Example 7 includes the subject matter of any of Examples 1-6, and wherein the feedback indicates a security action taken by the client computing device.

Example 8 includes the subject matter of any of Examples 1-7, and wherein the recommendation engine is to update a local database of the cloud server in response to receiving feedback from the client computing device.

Example 9 includes the subject matter of any of Examples 1-8, and wherein the application source data identifies a host of the browser-based application.

Example 10 includes the subject matter of any of Examples 1-9, and wherein the application source data indicates an internet protocol address at which the browser-based application is available.

Example 11 includes the subject matter of any of Examples 1-10, and wherein the source authentication module is to retrieve the source authentication data from a local database of the cloud server and the application verification module is to retrieve the application validation data from the local database.

Example 12 includes the subject matter of any of Examples 1-11, and wherein the source authentication module is to retrieve the source authentication data from cloud resources accessible to the cloud server and the application verification module is to retrieve the application validation data from the cloud resources.

Example 13 includes the subject matter of any of Examples 1-12, and wherein the source authentication module is to authenticate the source by comparing the application source data to the source authentication data, wherein the source authentication data includes a list of known malicious browser-based application hosts.

Example 14 includes the subject matter of any of Examples 1-13 and wherein the application verification module is to verify the security of the browser-based application by comparing the browser-based application to a trusted source code of the browser-based application.

Example 15 includes the subject matter of any of Examples 1-14, and wherein the application verification module is to verify the security of the browser-based application by comparing the browser-based application to the application validation data, wherein the application validation data includes known malware signatures.

Example 16 includes the subject matter of any of Examples 1-15, and wherein the application verification module is to retrieve the application validation data from cloud resources accessible to the cloud server.

Example 17 includes the subject matter of any of Examples 1-16, and wherein the application verification module is to retrieve the application validation data from a local database of the cloud server.

Example 18 includes the subject matter of any of Examples 1-17, and wherein the security recommendation indicates whether the browser-based application is secure.

Example 19 includes the subject matter of any of Examples 1-18, and wherein the recommendation engine is to update a local database of the cloud server in response to generating the security recommendation.

Example 20 includes the subject matter of any of Examples 1-19, and wherein the browser-based application is a Hypertext Markup Language 5 application or other web application.

Example 21 includes a client computing device for verifying the security of a browser-based application. The client computing device includes an application security module to (i) determine whether the client computing device has requested the browser-based application and (ii) in response to determining that the browser-based application has been requested, transmit an application verification request to a cloud service system to verify the security of the browser-based application; and a communication module to receive a security recommendation from the cloud service system; wherein the application security module further to perform a security action in response to the security recommendation.

Example 22 includes the subject matter of Example 21, and wherein the browser-based application is a Hypertext Markup Language 5 application or other web application.

Example 23 includes the subject matter of any of Examples 21 and 22, and wherein the application security module determining whether the client computing device has requested the browser-based application comprises determining whether the client computing device has executed a hyperlink directed to the browser-based application.

Example 24 includes the subject matter of any of Examples 21-23, and wherein the application security module transmitting the application verification request comprises transmitting at least a portion of the source code of the browser-based application to the cloud service system.

Example 25 includes the subject matter of any of Examples 21-24, and wherein the application security module transmitting the application verification request comprises transmitting location data indicating a location at which the browser-based application is available.

Example 26 includes the subject matter of any of Examples 21-25, and wherein the location data comprises a uniform resource locator of the browser-based application.

Example 27 includes the subject matter of any of Examples 21-26, and wherein the security action comprises notifying a user of the client computing device of the security recommendation.

Example 28 includes the subject matter of any of Examples 21-27, and wherein the security action comprises deleting the source code of the browser-based application from the client computing device.

Example 29 includes the subject matter of any of Examples 21-28, and wherein the security action comprises preventing downloading of the browser-based application to a memory of the client computing device.

Example 30 includes the subject matter of any of Examples 21-29, and wherein the security action comprises quarantining the browser-based application in a secure location of a memory of the client computing device.

Example 31 includes the subject matter of any of Examples 21-30, and wherein the application security module is to transmit feedback to the cloud service system.

Example 32 includes the subject matter of any of Examples 21-31, and further includes the feedback indicates the security action performed by the client computing device.

Example 33 includes the subject matter of any of Examples 21-32, and further includes a local code analysis module to perform a local security analysis of the browser-based application on the client computing device.

Example 34 includes the subject matter of any of Examples 21-33, and wherein the local security analysis comprises comparing the browser-based application to virus signatures.

Example 35 includes a method for generating a security recommendation for a browser-based application on a cloud service system. The method includes receiving the browser-based application and application source data that identifies a source of the browser-based application; retrieving source authentication data and application validation data; authenticating the source as a function of the application source data and the source authentication data; verifying the security of the browser-based application as a function of the application validation data; generating a security recommendation as a function of authenticating the source and verifying the browser-based application; and transmitting the security recommendation to a client computing device.

Example 36 includes the subject matter of Example 35, and wherein receiving the browser-based application comprises (i) receiving location data identifying a location of the browser-based application and (ii) downloading the browser-based application from a web server located at the identified location.

Example 37 includes the subject matter of any of Examples 35 and 36, and wherein receiving location data identifying a location of the browser-based application comprises receiving a uniform resource locator of the browser-based application.

Example 38 includes the subject matter of any of Examples 35-37, and further includes receiving a request from the client computing device to generate a security recommendation regarding the browser-based application.

Example 39 includes the subject matter of any of Examples 35-38, and wherein receiving the browser-based application and application source data from a remote location other than the client computing device.

Example 40 includes the subject matter of any of Examples 35-39, and wherein generating a security recommendation comprises identifying a level of trust of the browser-based application.

Example 41 includes the subject matter of any of Examples 35-40, and further includes receiving feedback from the client computing device in response to the security recommendation.

Example 42 includes the subject matter of any of Examples 35-41, and wherein receiving feedback comprises receiving feedback indicating an action taken by the client computing device.

Example 43 includes the subject matter of any of Examples 35-42, and further includes updating a local database of the cloud service system in response to receiving feedback from the client computing device.

Example 44 includes the subject matter of any of Examples 35-43, and wherein receiving application source data comprises receiving source data that identifies a host of the browser-based application.

Example 45 includes the subject matter of any of Examples 35-44, and wherein receiving the source data comprises receiving an internet protocol address at which the browser-based application is available.

Example 46 includes the subject matter of any of Examples 35-45, and wherein retrieving source authentication data and application validation data comprises retrieving source authentication data and application validation data from a local database of the cloud service system.

Example 47 includes the subject matter of any of Examples 35-46, and wherein retrieving source authentication data and application validation data comprises retrieving source authentication data and application validation data from cloud resources accessible to the cloud service system.

Example 48 includes the subject matter of any of Examples 35-47, and wherein authenticating the source comprises comparing the application source data to the source authentication data, wherein the source authentication data includes a list of known malicious browser-based application hosts.

Example 49 includes the subject matter of any of Examples 35-48, and wherein verifying the security of the browser-based application comprises comparing the browser-based application to a trusted source code of the browser-based application.

Example 50 includes the subject matter of any of Examples 35-49, and wherein verifying the security of the browser-based application comprises comparing the browser-based application to the application validation data, wherein the application validation data includes known malware signatures.

Example 51 includes the subject matter of any of Examples 35-50, and wherein retrieving application validation data comprises retrieving application validation data from cloud resources accessible to the cloud service system.

Example 52 includes the subject matter of any of Examples 35-51, and wherein retrieving application validation data comprises retrieving application validation from a local database of the cloud service system.

Example 53 includes the subject matter of any of Examples 35-52, and wherein generating a security recommendation comprises indicating whether the browser-based application is secure.

Example 54 includes the subject matter of any of Examples 35-53, and further includes updating a local database of the cloud service system in response to generating the security recommendation.

Example 55 includes the subject matter of any of Examples 35-54, and wherein the browser-based application is a Hypertext Markup Language 5 application or other web application.

Example 56 includes a computing device having a processor and a memory having stored therein a plurality of instructions that when executed by the processor cause the computing device to perform the method of any of Examples 35-55.

Example 57 includes one or more machine readable storage media comprising a plurality of instructions stored thereon that in response to being executed result in a computing device performing the method of any of Examples 35-55.

Example 58 includes a method for verifying the security of a browser-based application. The method includes determining, using the client computing device, whether the client computing device has requested the browser-based application; in response to determining that the browser-based application has been requested, transmitting an application verification request to a cloud service system to verify the security of the browser-based application; receiving, with the client computing device, a security recommendation from the cloud service system in response to transmitting the application verification request; and performing, on the client computing device, a security action in response to the security recommendation received from the cloud service system.

Example 59 includes subject matter of Example 58, and wherein the browser-based application is a Hypertext Markup Language 5 application or other web application.

Example 60 includes subject matter of any of Examples 58 and 59, and wherein determining whether the client computing device has requested the browser-based application comprises determining whether the client computing device has executed a hyperlink directed to the browser-based application.

Example 61 includes subject matter of any of Examples 58-60, and wherein transmitting the application verification request comprises transmitting at least a portion of the source code of the browser-based application to the cloud service system.

Example 62 includes subject matter of any of Examples 58-61, and wherein transmitting the application verification request comprises transmitting location data indicating a location at which the browser-based application is available.

Example 63 includes subject matter of any of Examples 58-62, and wherein transmitting the location data comprises transmitting a uniform resource locator of the browser-based application.

Example 64 includes subject matter of any of Examples 58-63, and wherein performing the security action comprises notifying a user of the client computing device of the security recommendation.

Example 65 includes subject matter of any of Examples 58-64, and wherein performing the security action comprises deleting the source code of the browser-based application from the client computing device.

Example 66 includes subject matter of any of Examples 58-65, and wherein performing the security action comprises preventing downloading of the browser-based application to a memory of the client computing device.

Example 67 includes subject matter of any of Examples 58-66, and wherein performing the security action comprises quarantining the browser-based application in a secure location of a memory of the client computing device.

Example 68 includes subject matter of any of Examples 58-67, and further includes transmitting feedback to the cloud service system.

Example 69 includes subject matter of any of Examples 58-68, and wherein transmitting feedback to the cloud service system comprises transmitting feedback indicating the security action performed by the client computing device.

Example 70 includes subject matter of any of Examples 58-69, and further includes performing a local security analysis of the browser-based application on the client computing device.

Example 71 includes subject matter of any of Examples 58-70, and wherein performing the local security analysis of the browser-based application comprises comparing the browser-based application to virus signatures.

Example 72 includes a computing device having a processor and a memory having stored therein a plurality of instructions that when executed by the processor cause the computing device to perform the method of any of Examples 58-71.

Example 73 includes one or more machine readable storage media comprising a plurality of instructions stored thereon that in response to being executed result in a computing device performing the method of any of Examples 58-71.

The invention claimed is:

1. A cloud server for generating a security recommendation for a browser-based application, the cloud server comprising:
   a communication module to receive an application verification request from a client computing device;
   a source authentication module to (i) receive application source data that identifies a source of the browser-based application, (ii) retrieve source authentication data from a local database of the cloud server, wherein the local database includes prior feedback from one or more client computing devices indicative of browser-based application security information; and (iii) authenticate the source as a function of the application source data and the source authentication data;
   an application verification module to (i) retrieve application validation data from the local database and (ii) verify the browser-based application as a function of the application validation data; and
   a recommendation engine to generate a security recommendation as a function of the authentication of the source authentication module, the verification of the application verification module, and the prior feedback;

wherein the communication module is further to transmit the security recommendation to the client computing device; and
wherein the recommendation engine is further to (i) receive feedback from the client computing device in response to transmittal of the security recommendation and (ii) update the local database based on the feedback received from the client computing device, the feedback indicative of results of a local security analysis of the browser-based application performed by the client computing device and a security action taken by the client computing device in response to receipt of the security recommendation by the client computing device.

2. The cloud server of claim 1, wherein the source authentication module is to (i) receive location data identifying a location of the browser-based application and (ii) download the browser-based application from a web server located at the identified location.

3. The cloud server of claim 2, wherein the location data includes a uniform resource locator of the browser-based application.

4. The cloud server of claim 1, wherein the source authentication module is to retrieve the application source data from a remote location other than the client computing device and the application verification module is to retrieve the browser-based application from the remote location.

5. The cloud server of claim 1, wherein the security recommendation identifies a level of trust of the browser-based application.

6. The cloud server of claim 1, wherein the application source data identifies at least one of: a host of the browser-based application and an internet protocol address at which the browser-based application is available.

7. The cloud server of claim 1, wherein:
the source authentication module is to retrieve the source authentication data from at least one of: a local database of the cloud server and cloud resources accessible to the cloud server; and
the application verification module is to retrieve the application validation data from at least one of: the local database and the cloud resources.

8. The cloud server of claim 1, wherein:
the source authentication module is to authenticate the source by comparing the application source data to the source authentication data, wherein the source authentication data includes a list of known malicious browser-based application hosts; and
the application verification module is to verify the security of the browser-based application by comparing the browser-based application to at least one of: a trusted source code of the browser-based application and the application validation data, wherein the application validation data includes known malware signatures.

9. The cloud server of claim 1, wherein the recommendation engine is to update the local database of the cloud server based on the security recommendation.

10. The cloud service of claim 1, wherein the browser-based application is a Hypertext Markup Language 5 application or other web application.

11. A client computing device for verifying the security of a browser-based application, the client computing device comprising:
an application security module to (i) determine whether the client computing device has requested the browser-based application from a source and (ii) in response to determining that the browser-based application has been requested from the source, transmit an application verification request to a cloud server, different from the source, to verify the security of the browser-based application;

a communication module to receive a security recommendation from the cloud server, wherein the security recommendation is based on prior feedback from one or more client computing devices indicative of browser-based application security information;

wherein the application security module is further to download the browser-based application from the source in response to the security recommendation indicating that the browser-based application is secure; and a local code analysis module to perform a local security analysis of the browser-based application on the client computing device;

wherein the application security module is further to (i) perform a security action based on the security recommendation of the cloud server and the local security analysis in response to the security recommendation or the local security analysis indicating that the browser-based application is unsecure and (ii) transmit feedback to the cloud server, wherein the feedback is indicative of results of the local security analysis.

12. The client computing device of claim 11, wherein the browser-based application is a Hypertext Markup Language 5 application or other web application.

13. The client computing device of claim 11, wherein the application security module determining whether the client computing device has requested the browser-based application comprises determining whether the client computing device has executed a hyperlink directed to the browser-based application.

14. The client computing device of claim 11, wherein the application security module transmitting the application verification request comprises transmitting at least one of: (i) at least a portion of the source code of the browser-based application or (ii) location data indicating a location at which the browser-based application is available.

15. The client computing device of claim 14, wherein the location data comprises a uniform resource locator of the browser-based application.

16. The client computing device of claim 11, wherein the security action comprises at least one of:
notifying a user of the client computing device of the security recommendation;
deleting the source code of the browser-based application from the client computing device;
preventing downloading of the browser-based application to a memory of the client computing device; and
quarantining the browser-based application in a secure location of a memory of the client computing device.

17. The client computing device of claim 11, wherein the application security module is to transmit feedback to the cloud server, the feedback indicating the security action performed by the client computing device based on the security recommendation.

18. The client computing device of claim 11, wherein the local security analysis comprises comparing the browser-based application to virus signatures.

19. One or more non-transitory machine-readable storage media comprising a plurality of instructions stored thereon that, in response to being executed, result in a computing device:
receiving a browser-based application and application source data that identifies a source of the browser-based application;
retrieving source authentication data and application validation data from a local database of the computing device, wherein the local database includes prior feedback from one or more client computing devices indicative of browser-based application security information;
authenticating the source as a function of the application source data and the source authentication data;
verifying the security of the browser-based application as a function of the application validation data;
generating a security recommendation as a function of authentication of the source, verification of the browser-based application, and the prior feedback;
transmitting the security recommendation to a remote computing device;
receiving feedback from the remote computing device in response to transmitting the security recommendation, the feedback indicating results of a local security analysis of the browser-based application performed by the client computing device and an action taken by the remote computing device in response to receiving the security recommendation; and
updating the local database based on the feedback received from the remote computing device.

20. The one or more non-transitory machine-readable storage media of claim 19, wherein the plurality of instructions further result in the computing device:
receiving a request from the remote computing device to generate a security recommendation regarding the level of trust of the browser-based application.

21. The one or more non-transitory machine-readable storage media of claim 19, wherein:
authenticating the source comprises comparing the application source data to the source authentication data, wherein the source authentication data includes a list of known malicious browser-based application hosts; and
verifying the security of the browser-based application comprises comparing the browser-based application to at least one of: a trusted source code of the browser-based application and the application validation data, wherein the application validation data includes known malware signatures.

22. The one or more non-transitory machine-readable media of claim 19, wherein the browser-based application is a Hypertext Markup Language 5 application or other web application.

* * * * *